United States Patent Office 3,166,106
Patented Jan. 19, 1965

3,166,106
CASK CLEANSING AND FILLING SYSTEMS
John Edwin Reeve and Frank Jesse Kingsman, London,
England, assignors to G. Hopkins & Sons Limited, London, England, a company of Great Britain and Northern Ireland
Filed May 26, 1961, Ser. No. 112,820
Claims priority, application Great Britain, May 27, 1960, 18,845/60
11 Claims. (Cl. 141—91)

This invention relates to the cleansing of valved containers and their filling under pressure.

It is particularly intended to be applied to the cleansing and filling of so-called "pressure casks" which are equipped with dual valve passages for the simultaneous and independent entry of gas and liquid. One example of a cask valve of this type is described in our United States Patent No. 3,036,586.

According to the invention, we provide apparatus for cleansing and filling a container provided with a filling valve comprising a valve member having two valve-controlled passages, through which valve member the inflow and discharge of materials used in the successive operations of a cleansing and filling cycle can be performed, the said passages being arranged to be applied continuously to the container valve throughout the cycle.

Advantageously, when the apparatus according to the invention is to be used for filling containers with liquid, the liquid is fed from a tank through a conduit into a container, displacing the gas therein. A float-type non-return valve is provided in said conduit to stop the flow of liquid from the tank. The apparatus may then comprise a holding vessel, connectable to the apertured device, so that liquid between the tank and the container is fed to said vessel when the flow from the tank has stopped and is allowed to flow from said vessel to another container in a succeeding filling operation when a froth-producing liquid is to be used, a holding vessel may be provided having an inlet from the apertured device and an outlet to a froth collection container, a float valve being arranged to close said outlet when the vessel is filled with liquid. Means are provided to return settled-out liquid from the froth collection container to the tank.

We shall now describe various forms of the invention with reference to the accompanying drawings wherein.

Referring to the drawings, a valved cask 34 is shown having an inner valve passage 35 opening to the interior of the cask at the bottom, and an outer valve passage 36 opening to the interior of the cask at the annulus 37, of such shape that the cleansing fluids may be used to the best advantage.

A racking head or valve member 10 has a rotary apertured device, in this case a multi-port plug cock or valve 11, represented in FIGS. 1 to 10 inclusive of the drawings by two circular cross-sections. On the side of the plug cock 11 remote from the cask 34 are pipelines 12 (to a beer ring main 13), 14 and 15 (to a beer-holding vessel 16) 47 (to a froth collection ring main 65), 17 (carrying carbon dioxide from a ring main 82) 22 (carrying steam from a ring main 83) and 24 (carrying water from a ring main 84). A drain 62 is also provided (shown in FIG. 5). A further ring main 85 supplies air under pressure for the pneumatic operation of the apparatus.

Figure 1:
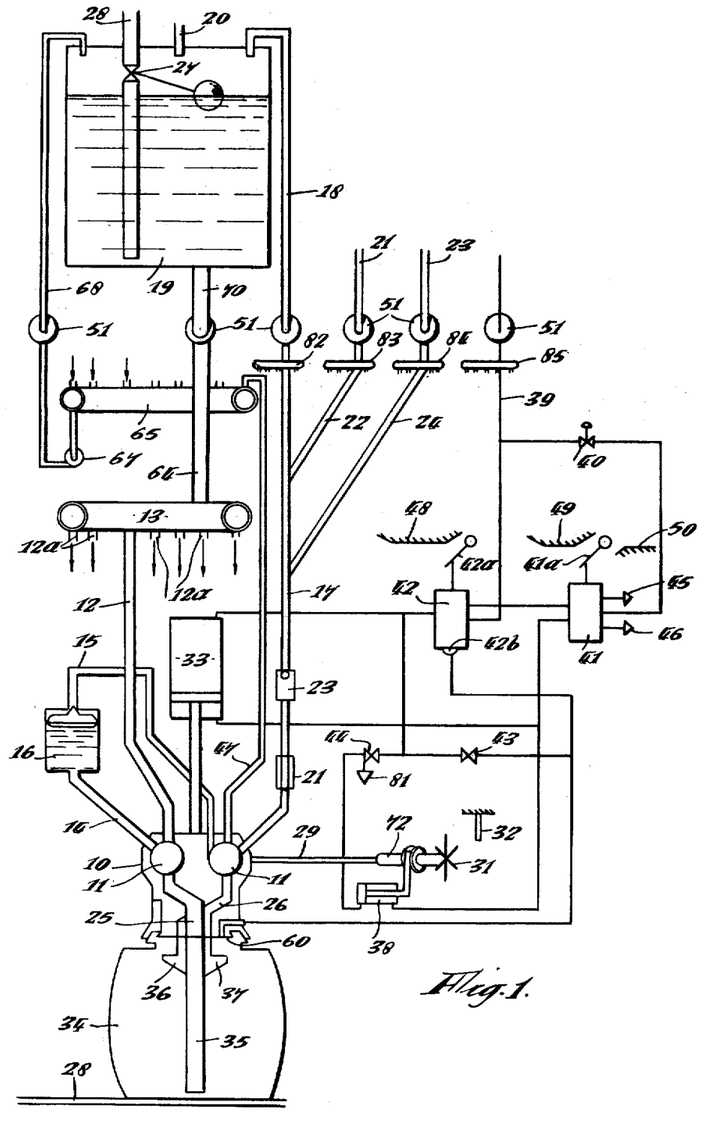
FIG. 1 is a diagrammatic view of part of a beer cask cleansing and filling apparatus for use with casks equipped with valves of the type described in United States Patent No. 3,036,586.
Figures 1A, 11:
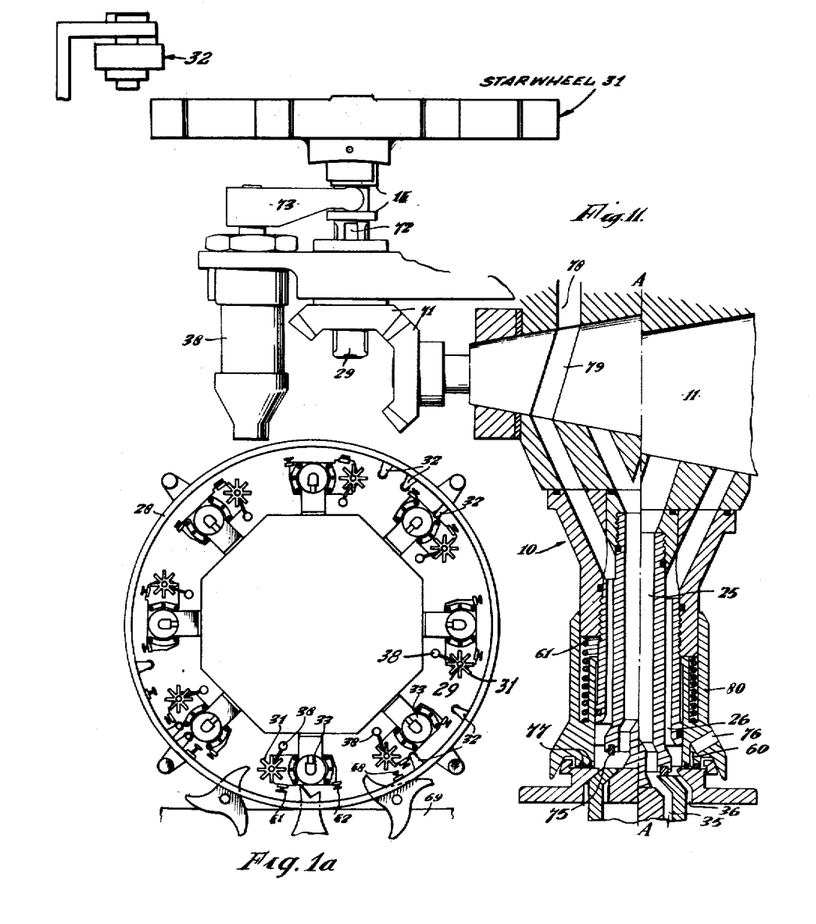
FIGS. 1a and 1b are views of a turntable arrangement of the apparatus according to the invention, having a number of racking heads for the continuous throughput of a series of casks, FIG. 1b being a partly broken-away elevation and FIG. 1a being a plan view of the arrangement.
FIG. 11 is a detail view illustrating in section a valve member or racking head having a multi-port plug cock and a mechanism for operating the plug cock.
Figure 1B:
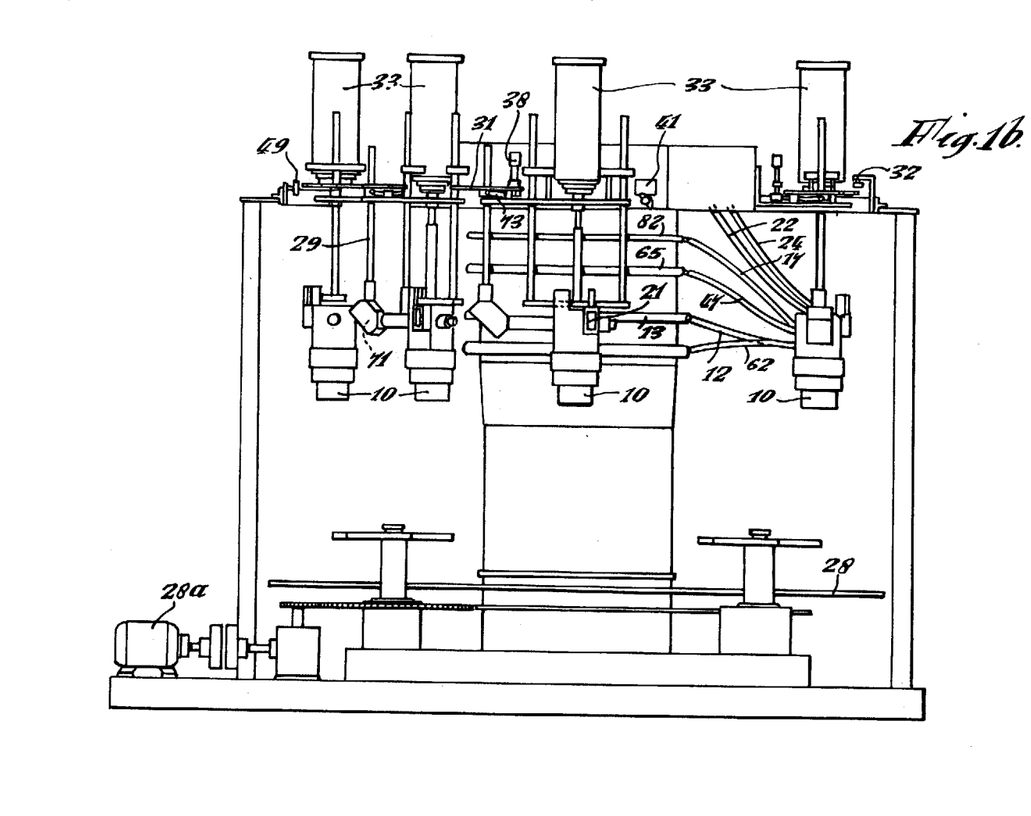

In FIG. 11 the plug cock 11 and the racking head 10 are shown in section. The part of the figure to the right of centre-line AA the racking head is shown lowered to its fullest extent so that the inner and outer passages 25, 26 respectively of the head are sealed from each other by a sealing ring 75 and communicate with the passages 35 and 36 of the cask valve respectively.

Further passages are provided in the racking head, on the side remote from the cask, one for each fluid connection hereinbefore described. Passage 78 in FIG. 11 is a typical example. Ports, exemplified by 79, are provided in the plug cock 11 so that these passages may be connected in a pre-determined sequence (as will be described hereinafter) with the passages 25 and 26 co-operating with the cask valve passages 35 and 36.

The plug cock 11 is rotated by a shaft 29 to which it is connected in the example shown by a bevel gear 71. A second shaft 72 is splined at one end to the shaft 29 and carries at its other end a starwheel 31 (shown in FIG. 11). An air operated control cylinder 38 carries an arm 73 fixed to its piston, the arm being located between collars 74 fixed to the second shaft 72. Under the action of the control cylinder, the starwheel fixed to the shaft 72 is moved axially to bring it into and out of the path of the action of a series of trips 32 (shown in FIG. 11).

The racking head 10 comprises a skirt 80 which is provided with a weep orifice 60 which is fed through a tapping 76 and takes the form of an annulus between two sealing rings 77 in the skirt 80.

A skirt spring 61 between the skirt 80 and the rest of the packing head allows the sealing rings 77 to seat upon the cask valve before the cask valve passages are opened as is shown to the left of centre-line AA in FIG. 11. By urging the racking head further downwards the spring is compressed and the cask valve passages are opened as is shown to the right of centre-line AA.

An air cylinder 33 (not shown in FIG. 11) serves to lower and raise the racking head 10 into and out of operative engagement with a cask beneath the head.

The air pressure operating system for the air cylinder 33 and the control cylinder 38 is supplied from the high pressure air line 39. The components of the system include a pressure reducing valve 40, a first and a second valve 41 and 42 respectively, a throttling valve 43 and an unloader valve 44 arranged to open in the direction of flow right to left only when the air pressure has reached a given minimum value (referred to herein as "high pressure") and in the direction of flow left to right connects the pipeline 54 to exhaust point 81.

The first valve 41 is cam-operated through a member 41a and the second valve 42 can be operated either through a member 42a or through an air pressure connection 42b. The air system exhausts through points 45 and 46.

The beer ring main 13 is fed through pipelines 64 and 70 from a constant level beer tank 19, the level in which is controlled by a float valve 27. A carbon dioxide main 20 feeds gas under pressure to the top of the tank 19 and a supply pipe 18.

The racking head 10 and the pressure air operating system is one of several arranged to rotate with a turntable 28 driven by a motor 28a on which the casks 34 are carried. Fixed to stationary parts of the apparatus are the trips 32 (which operate the starwheel 31) and the cams 48, 49 and 50 for operating the valves 41 and 42. The various fluids used are transferred from the stationary to the rotating parts of the apparatus by rotary unions 51. Ring mains 82 to 85 inclusive are provided for each fluid and, as exemplified by outlets 12a on the beer main 13, each main has separate outlets communicating with each of the racking heads on the complete apparatus.

In the FIGS. 2 to 10, the pressures in the air pipelines at various stages in a cycle of operations are shown as follows: thick full lines, high pressure; normal full lines, exhaust pressure; chain-dotted lines, medium pressure; broken lines, low pressure. By way of non-limitative illustration, pressures of the orders of about 50 lb./sq. in. for high pressure air and 30–40 lb./sq. in. for medium pressure air have been used successfully but the values chosen will, of course, depend upon such factors as the sizes of the components, friction forces and spring forces.

Figure 2:
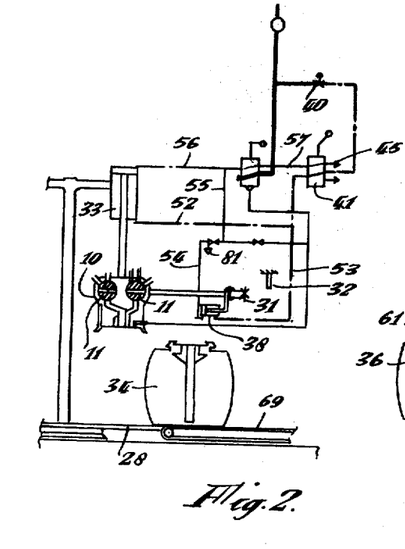
FIGS. 2 to 10 inclusive illustrate, diagrammatically, parts of the apparatus at successive stages in a cycle of operations.

FIG. 2 shows the initial stage of a cycle of operations during which a cask 34 is transferred from a feed conveyor 69 to a station on the turntable 28 underneath the racking head 10. The valve 41 is in a position which allows pressure air, reduced to a medium pressure by the valve 40, to flow into pipelines 52 and 53 to the underside of the air cylinder 33 and the right-hand side of the control cylinder 38 respectively. The top of the air cylinder and the left-hand side of the control cylinder are open to the exhaust points 45 and 81 via pipelines 54, 55, 56 and 57. Thus the racking head 10 is held in its uppermost position, clear of the cask, and the starwheel 31 is held out of the path of action of the trips 32.

The next step (FIG. 3) is actuated by depression of the operating member 41a of the valve 41 as it passes the stationary cam surface 48. The medium pressure air entering the valve 41 is now routed through the pipeline 57 to the valve 42 whence it flows via the pipeline 56 to the top of the air cylinder 33 and via the pipeline 55 to the unloader valve 44 and throttling valve 43. The pressure is not sufficiently high to allow flow through the unloader valve but air does flow through the throttling valve, its pressure being lowered by this valve. Thus, low pressure air enters pipelines 58 and 59 to the second valve 42 and the weep orifice 60 in the skirt of the racking head 10 respectively. In addition, the lower end of the cylinder 33 and the right-hand end of control cylinder 38 are now open to exhaust point 46 via pipelines 52 and 53. The air cylinder piston is lowered by the flow through the pipeline 56 to bring the skirt 80 of the racking head into contact with the cask valve. The spring 61 in the racking head prevents the complete downward movement of the racking head, which would open the cask valve passages 35 and 36, while only medium pressure air is acting on the air cylinder 33.

Figure 4:
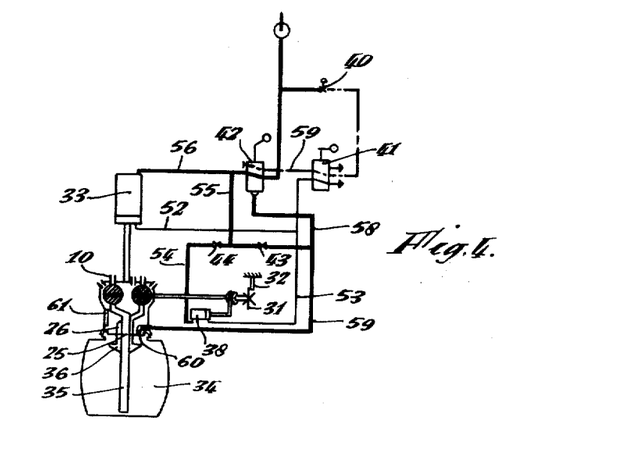

The low pressure air routed through the pipelines 58 and 59 to the second valve 42 and the weep orifice 60 actuates the next operation (FIG. 4). If the cask is correctly positioned under the racking head the weep orifice will have been closed by the parts of the cask valve in contact with the racking head. The effect of this is to build up the pressure in the pipelines 58 and 59 as air continues to flow through the throttling valve 43 until it reaches the same pressure as is in the pipeline 55 when flow will cease. However, before this state is reached at a given pressure (which is not high enough to operate the unloader valve 44), the valve 42 is operated by the pressure, allowing the high pressure air supply to by-pass the valve 41 and enter the system through the pipelines 55 and 56. The pressure at the top of the air cylinder 33 is then sufficiently high to overcome the resistance of the spring 61 and the lowering of the racking head 10 is completed, opening the passages 25 and 26 in it to the passages 35 and 36 of the cask respectively. The high pressure air flowing through the pipeline 55 operates the unloader valve 44 and enters the pipeline 54 to drive the piston of the control cylinder 38 to its rightmost position thus bringing the starwheel 31 in line with the trips 32.

The pressure air system has now completed the function of setting the apparatus into its operative condition after ensuring that the cask is correctly positioned under the racking head. The cleansing and filling of the cask is now performed by the continuing rotation of the turntable 28 carrying the starwheel 31 into contact with successive trips 32 and the rotation of the plug cock 11 thereby.

Figure 5:
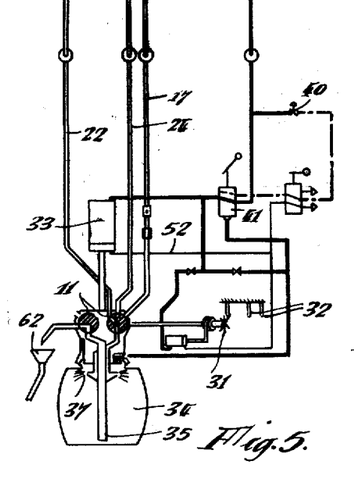

The cleansing process is indicated in FIG. 5. The sequence used in this embodiment is (i) water spray, (ii) steam sterilise, (iii) carbon dioxide purge. In each of these operations the fluids, coming from their ring mains through pipelines 24, 22 and 17 respectively, enter the cask 34 through the annulus 37 and are expelled through the valve passages 35 to the drain 62. A cooling spray 63 (shown in FIG. 6) may be applied to the outside of the cask. The relative times of the cleansing operations are determined by the spacing of the trips 32.

Figure 6:
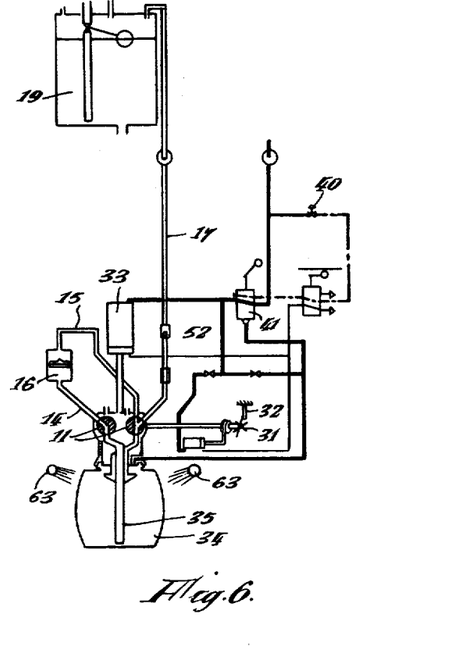
Figure 7:
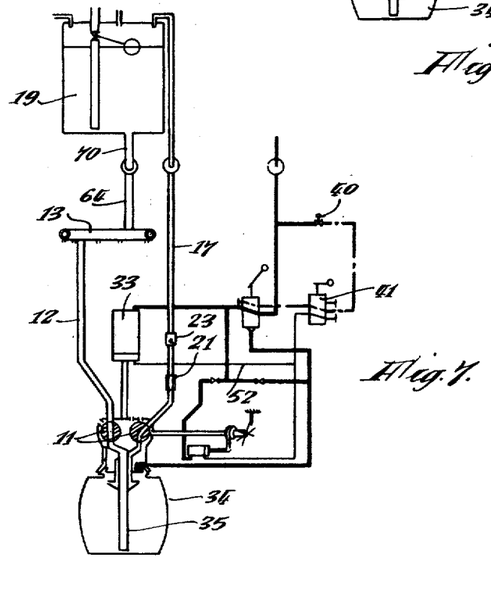

The filling process is indicated in FIGS. 6 and 7. FIG. 6 shows the first stage of the process. Rotation of the plug cock 11 by the starwheel 31 allows pressurised carbon dioxide to flow from the pipeline 17 into the cask and, in addition, beer in the bear-holding vessel 16 which has accumulated from a previous cycle of operations is allowed to drain into the cask, the gas also being fed to the top of the vessel 16 via the pipeline 15.

The next movement of the plug cock 11 connects the pipeline 12 to the cask valve passage 35 (FIG. 7). Beer flows into the cask from the ring main 13 which draws its supply from the tank 19 through pipelines 64 and 70. The carbon dioxide in the cask is displaced through pipeline 17 back to the gas space in the tank 19. A sight-glass 21 makes it possible to observe when the carbon dioxide has been completely displaced from the cask and a float-type non-return valve 23 prevents further flow of liquid.

Figure 8:
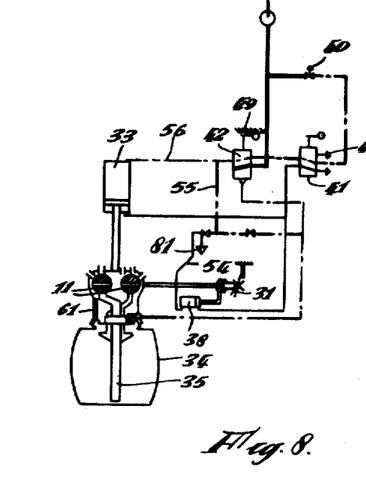

The plug cock 11 is now rotated to an "off" position. Immediately following this the valve 42 is operated by the cam surface 49. The air supply to the pipelines 55 and 56 is thereby reduced to medium pressure as is shown in FIG. 8. This permits the spring 61 in the racking head to expand against the piston of the air cylinder 33 raising the internal parts of the head and so closing the cask valves. The unloader valve 44 is also affected by the change of air pressure and closes against air supply from pipeline 55 while opening pipeline 54 to the exhaust point 81. Because both ends of the control cylinder 38 are now connected to exhaust pressure, no movement of the cylinder takes place.

At the next stage in the sequence of operations (FIG. 9), the plug cock 11 is rotated by movement of the starwheel 31 to connect the pressurised carbon dioxide supply (from the pipeline 17) and the bottom of the liquid-holding vessel 16 to the interior of the racking head. Also the top of the liquid-holding vessel 16 is connected to the froth collection ring main 65 through the pipelines 15 and 47. The carbon dioxide from pipeline 17 thus forces out the contents of the racking head into the holding vessel and any gas or froth that is in the holding vessel to the froth collection ring main which is at a lower pressure than the carbon dioxide supply. A pressure-adjustable vent 66 in the ring main 65 provides an outlet for gases. The liquid is allowed to settle out in the ring and is pumped by pump 67 through pipeline 68 to the tank 19.

Figure 9:
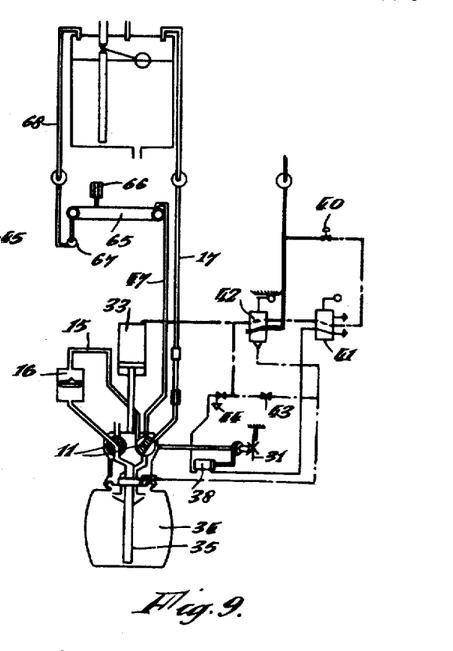

When the racking head 10 has been emptied, the starwheel is given a further rotation and the plug cock moves to an "off" position.

Figure 10:
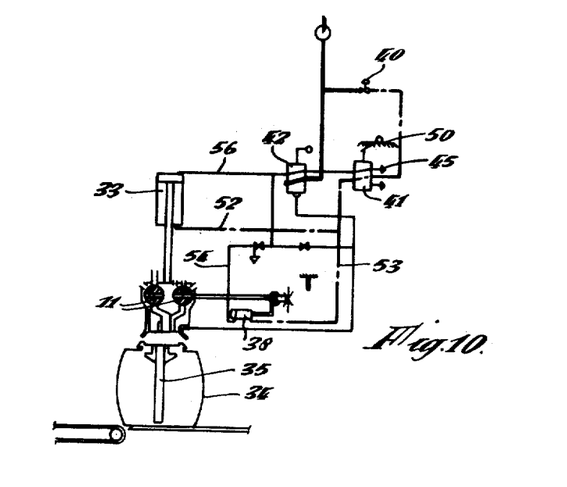

The final stage of the cycle is indicated in FIG. 10. The air valve 41 is operated by the cam 50 to introduce medium pressure air into the pipelines 52 and 53 and to connect the pipelines 54 and 56 to the exhaust points 81 and 45 respectively. By this means the racking head 10 is raised clear of the cask which is now free to be ejected from the turntable and the starwheel is retracted from the path of the operating trips. The parts of the apparatus are then in the same positions as those shown in FIG. 2 and a fresh cycle of operations can be started when the head has reached the cask loading station on the turntable.

Referring to FIGS. 12 to 15 inclusive, an alternative pressure air control system is shown in which the parts identical with those shown in the previous figures have been designated by the same reference numerals. In this alternative a shuttle valve 86 is employed instead of the unloader valve 44.

Figure 12:
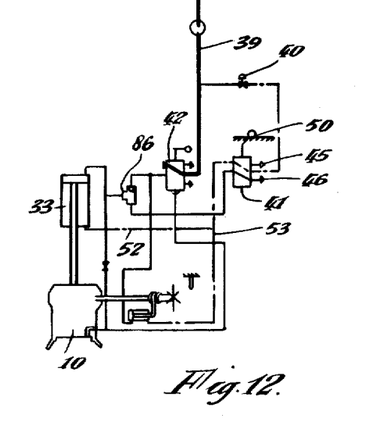
FIGS. 12 to 15 inclusive illustrate diagrammatically an alternative pressure air control system at four different stages that occur in the cycle of operations described with reference to FIGS. 2 to 10 inclusive.

FIG. 12 shows the circuit at those stages of the cycle of operations previously described with reference to FIG. 2 and FIG. 10. Medium pressure air is allowed through the valve 41 to the underside of the air cylinder 33 and to the right-hand side of the control cylinder 38 via the pipelines 52 and 53 respectively. High pressure air has no outlet from the valve 42.

Figure 3:
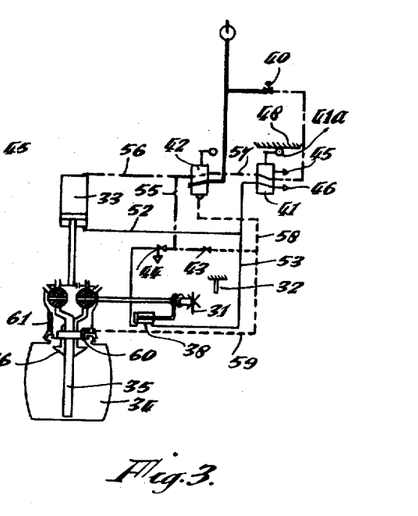
Figure 13:
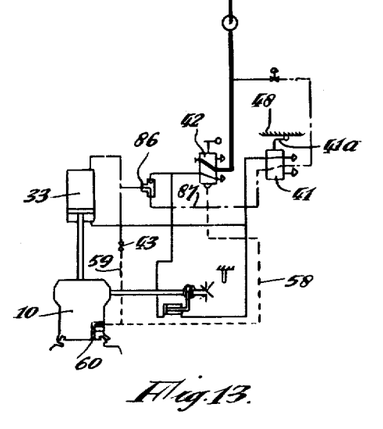

FIG. 13 shows the circuit at the stage previously indicated in FIG. 3. The operating member 41a of the valve 41 has been depressed by the cam surface 48 and the medium pressure air is now routed via pipeline 87 through the shuttle valve 86. From there it is able to flow to the top of the air cylinder 33 and also through the throttling valve 43 to the weep orifice 60 and the second valve 42.

Figure 14:
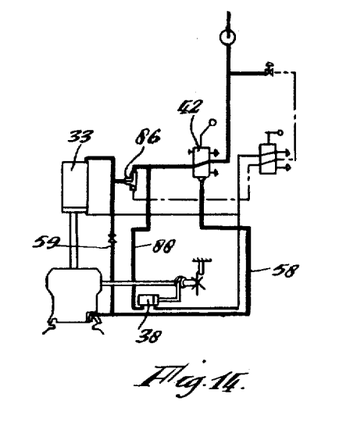

If the racking head is correctly positioned on the cask valve, the pressure beyond the throttling valve in pipelines 59 and 58 will build up and eventually operate the second valve 42, as previously described, to reach the state shown in FIG. 14 (corresponding to FIGS. 4 to 7 inclusive). High pressure air is admitted to the circuit through the valve 42 and can flow directly to the left-hand end of the control cylinder 38 through pipeline 88. In addition, its pressure operating the shuttle valve 86, it passes therethrough to the top of the air cylinder 33. The pressure beyond the throttling valve in pipelines 59 and 58 will increase until it reaches the high pressure valve.

Figure 15:
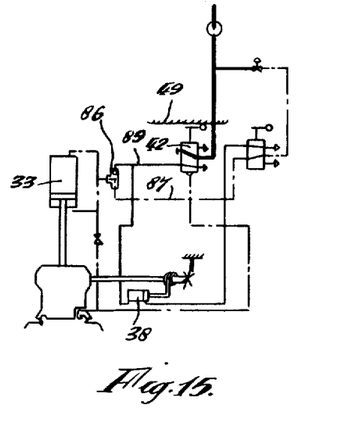

In FIG. 15 (corresponding to FIGS. 8 and 9), the valve 42 is operated by the cam surface 49 closing off the high pressure air supply and opening pipeline 89 to exhaust. When the pressure in the air cylinder 33 has dropped sufficiently, the shuttle valve 86 operates once more under the influence of medium pressure air in pipeline 87. As indicated in the circuit of FIG. 8, both ends of the control cylinder 38 are connected to exhaust and therefore no movement of the cylinder takes place.

The alternative pneumatic circuit shown in FIGS. 16 to 19 is generally similar to that in FIGS. 12 to 15 and those parts common to both are indicated by the same reference numerals. In this alternative however, the connection of the throttle valve 43 to the air line between the shuttle valve 86 and the air cylinder 33 has been dispensed with and the throttle valve is instead connected to the air line 87 between the shuttle valve and the first valve 41. It will also be seen in FIG. 16 that the main air supply line 39 is branched before the ring main distribution system and high and medium pressure air are supplied through separate ring mains 90, 91 respectively.

Figures 16, 17:
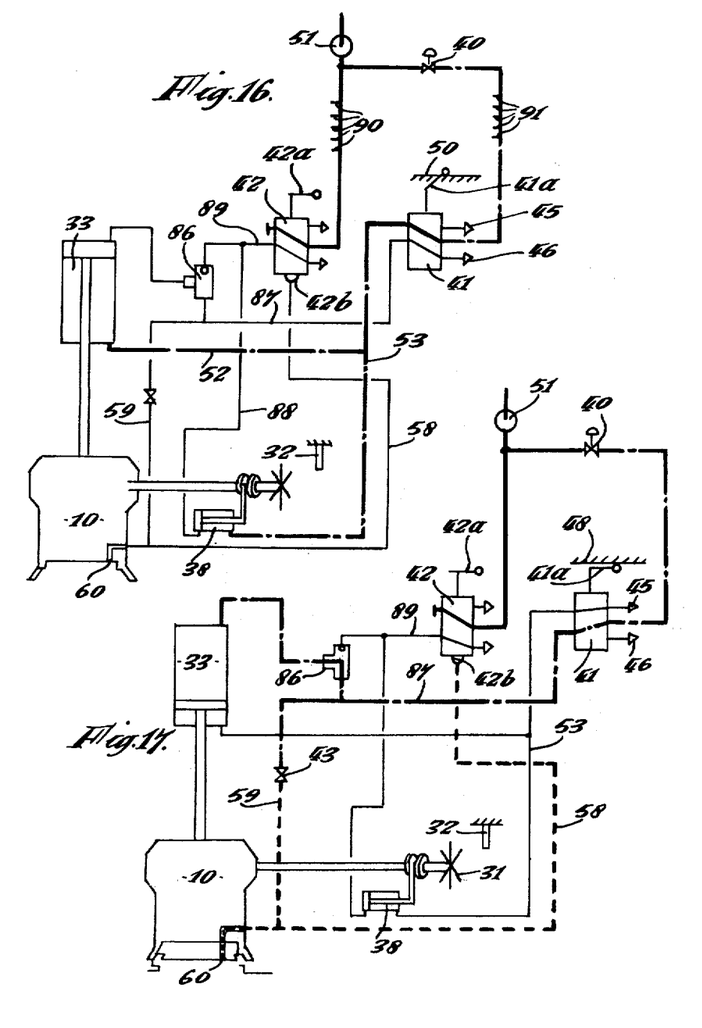
FIGS. 16 to 19 inclusive illustrate another pressure air control system at the four different stages shown in FIGS. 12 to 15.

FIG. 16 shows the circuit before a cask has been moved into position under the racking head and it will be seen that the effective parts of the circuit at this stage are the same as described for FIG. 12. As shown in FIG. 17 depression of the operating member 41a of the valve 41 (the stage previously indicated in FIGS. 3 and 13) routes medium pressure air via the pipeline 87 through the shuttle valve 86 to the top of the air cylinder 33 and also through the throttling valve 43 to the weep orifice 60 and the second valve 42. The valve 41 also exhausts the right-hand side of cylinder 38.

Figures 18, 19:
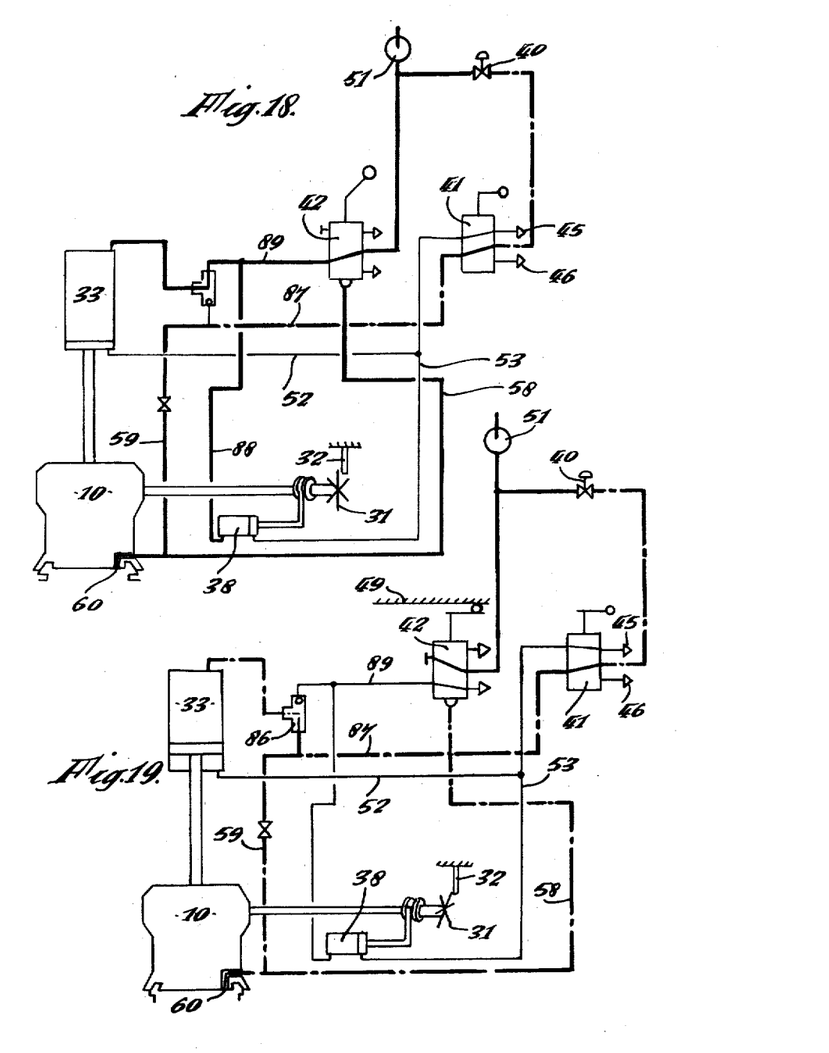

The cleansing and filling operations will then be actuated in the manner described before the pneumatic circuit in FIG. 18 shows the stage at which the valve 42 is operated so as to force down the racking head 10 to open the cask passages and to move the starwheel 31 into the path of the trips 32. FIG. 19 shows the circuit at the stage corresponding to FIGS. 8 and 9, the valve 42 being operated by the cam surface 49 and thus closing the high pressure air supply to the circuit and opening the air line 89 to exhaust.

The operation of this last-described circuit can be varied by modifying the sequence of actuation of the first and second valves 41, 42. Thus, the stage shown in FIG. 19 is attained initially by operating the valve 41 by the cam surface 50, raising its member 41a, so that medium pressure air is now connected via the pipeline 52 to the bottom of the air cylinder 33 and via the pipeline 53 to the right-hand end of the cylinder 38. No movement of the cylinder 38 takes place because high pressure air is still connected to its left-hand end. The medium pressure air below the piston of the cylinder 33 assists the spring 61 in the racking head to expand, raising the internal parts of the head and so closing the cask valves. In addition the pipeline 87 is now opened to exhaust, removing pressure from the valve 42 via the throttling valve 43 and the pipelines 59 and 58.

The member 42a is then depressed by the cam surface 49, operating the valve 42 to exhaust the top of the cylinder 33 via the shuttle valve 86 and to exhaust the left-hand end of the cylinder 38 via pipeline 84. The cylinder 33 raises the head clear of the cask under the action of medium pressure air and the cylinder 38 moves from right to left disengaging the starwheel from the trips. The actuation of the other stages of the operations is performed in the manner described with reference to FIGS. 17 and 18.

Figure 20:
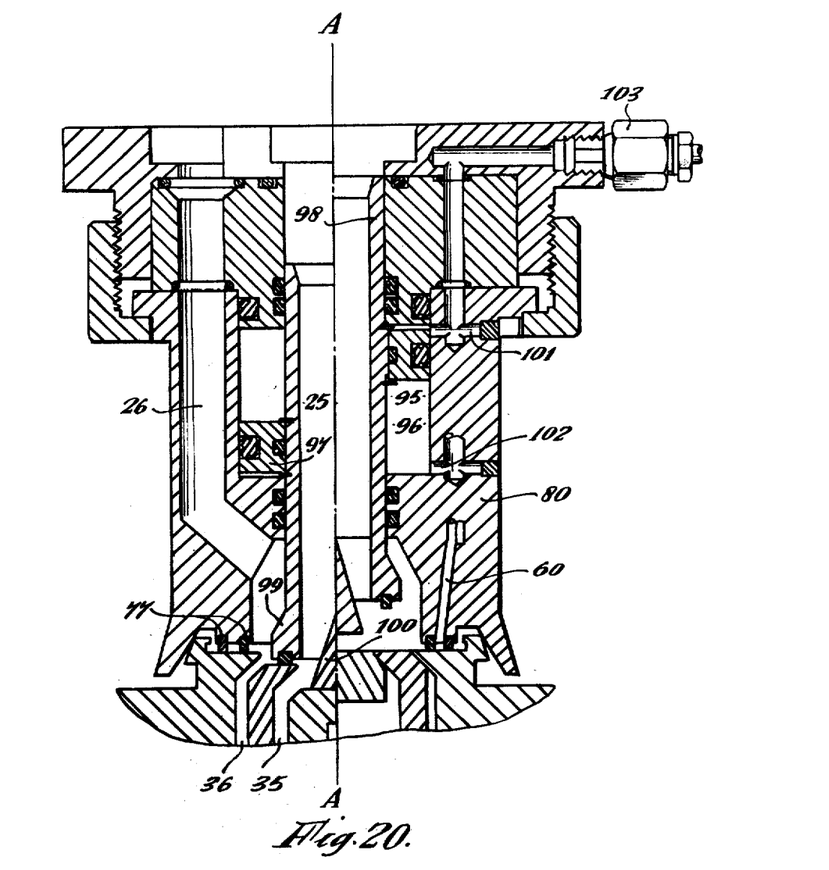
FIG. 20 shows in section an alternative form of valve member or racking head.

FIG. 20 illustrates an alternative form of racking head. The figure is a composite section, that part to the left of centre-line AA showing the head lowered to its fullest extent. The essential difference from the head illustrated in FIG. 11 is that, in place of the spring 61 between the skirt 80 and the body of the head, a pneumatic cylinder 95 is provided within the body of the head. The head cylinder 95 comprises a chamber 96 within which a closely fitting piston 97 can slide. The piston is fixed to sleeve 98 which carries at its lower end abutments 99, 100, which can bear against the cask valve to open its passages 35, 36 to communicate with the passages 25, 26 in the head as described above. Air passages 101, 102 open into the top and bottom respectively of the chamber 96 and are connected to the operating pneumatic circuit by external unions 103, only one of which is shown. Above the racking head is an apertured device (not shown), such as the multi-port plug cock previously described with reference to FIG. 11, with which the passages 25, 26 communicate.

With the alternative form of racking head, a modified pneumatic system is used, one example being shown schematically in FIGS. 21 to 24. Those components common to the systems already described are given the same reference numerals.

Figure 21:
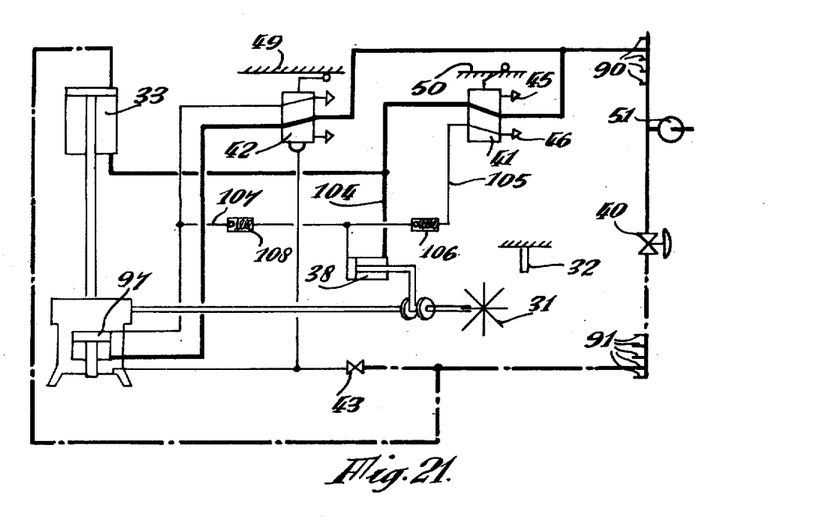
FIGS. 21 to 24 inclusive illustrate diagrammatically a pressure air control system for use with the valve member in FIG. 20 at the four different stages referred to above.
Figure 22:
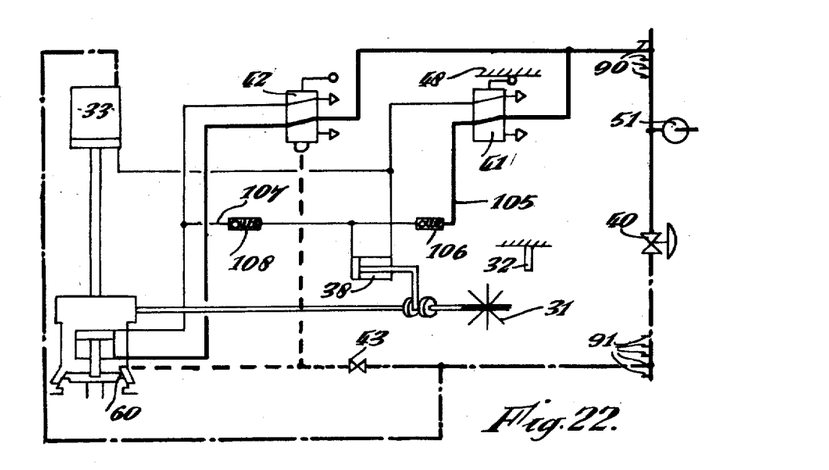

FIG. 21 shows the circuit at the stage when the racking head is fully raised, corresponding to the stage shown in FIGS. 2, 10 and 16. It will be seen that medium pressure air from the ring main 91 is fed direct to the top of the air cylinder 33, the piston of which is kept raised however, by high pressure air from the first valve 41 which also, through air line 104, keeps the piston of the control cylinder 38 in the left hand position. High pressure air from the second valve 42 keeps the piston 97 in the racking head raised.

Figure 23:
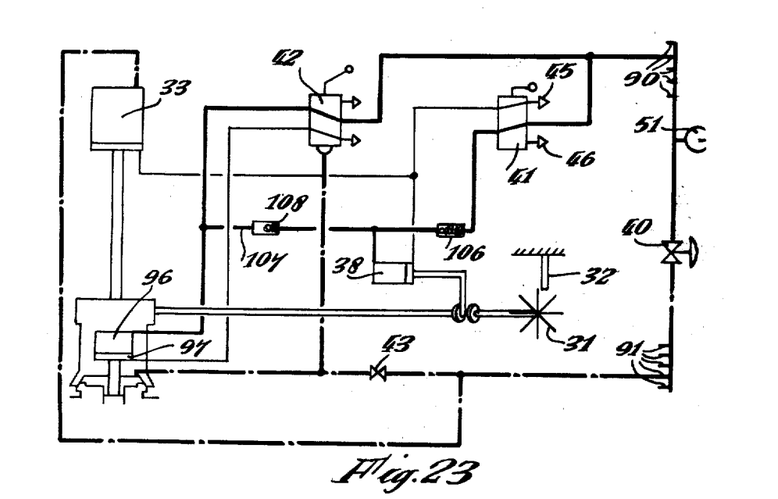

Operation of the first valves 41 by the cam surface 48 (FIG. 22) lowers the head into contact with a cask by exhausting the bottom of the air cylinder 33. The high pressure air from the valve 41 is now routed through air line 105 to a non-return valve 106, where it is blocked, and exhausts the right-hand side of exhaust cylinder 38 in preparation for a later stage. The build-up of pressure at the weep orifice 60 takes place in the manner previously described to operate the second valve 42, as shown in FIG. 23. High pressure air is now able to flow through this valve to the head cylinder 96 thus lowering the piston 97 and bringing the passages 25, 26 into communication with the cask passages 35, 36. High pressure air also flows through air line 107, opening a non-return valve 108 therein to operate the control cylinder 38 and set the starwheel 31 in the path of the trips 32.

Figure 24:
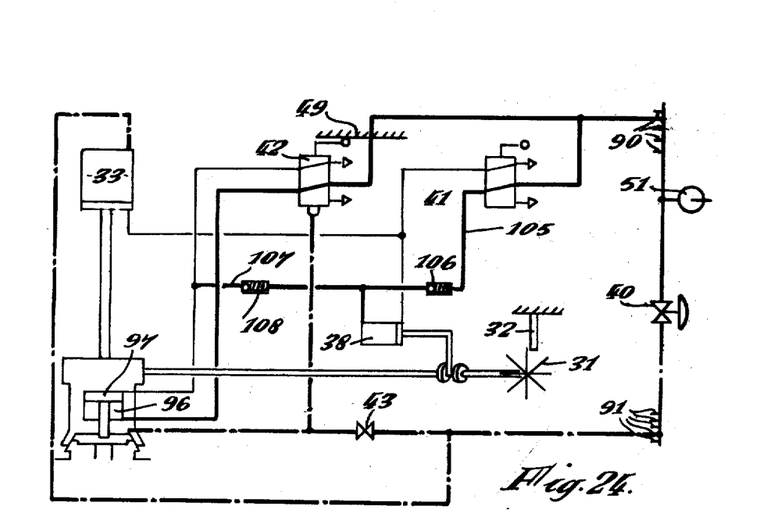

The cleansing and filling operations can then take place. In FIG. 24, the circuit is shown in the stage corresponding to FIGS. 8, 9, 15 and 19. The second valve 42 has been operated by the cam surface 49 exhausting the top of the head cylinder 96 and feeding high pressure air to the bottom of that cylinder. The cask valve passages are thus allowed to close while the head is still urged against the cask valve by medium pressure air fed to the top of the air cylinder 33. It will be noted that the air line 107 is also opened to exhaust by this operation of the valve 42 but the control cylinder 38 is still able to hold the starwheel 31 in the path of the trips 32 because the non-return valve 108 is operative since the pressure air from the control cylinder cannot open the non-return valve 106 as its pressure is balanced by high pressure air from the first valve 41.

On completion of the operations of the cycle, actuation of the first valve 41 by the cam surface 50 re-introduces high pressure air to the bottom of the air cylinder 33 and to the right-hand side of the control cylinder 38 and exhausts the air line 105 allowing the high pressure air in the left-hand side of the control cylinder to escape past the non-return valve 106. The circuit has then returned to the state depicted in FIG. 21.

With the last-described form of circuit, it has been found that a more sensitive control of the movement of the racking head can be obtained. The medium air pressure can be reduced to about a half its value in the previous circuits described and it is possible to obviate any danger of damaging the casks as they are cleansed and filled.

In an alternative beer-flow system, the froth collection ring main 65, the pipelines 15, 47 and 68 and their intermediate parts can be omitted, and a beer collecting ring main be inserted between pipeline 14 and holding vessel 16. In this arrangement the beer holding vessel 16 is provided with a bottom drain outlet to a pump which forces the beer therefrom through a pipeline to the beer ring main 13. In this embodiment the vent 66 is situated on the top of the beer holding vessel.

Examples may be mentioned of other forms of apertured device. One form, like the multi-port plug cock is a rotary apertured device but its movable parts are disc or sleeve valve elements. In another form, the fluid conveyancing means are connected in sequence to a pair of passages in communication with the passages 25, 26 respectively of the racking head by means of a series of poppet valves arranged in two banks, each bank giving access to one passage. The poppet valves may be arranged to be operated from a common camshaft.

It should be understood that the particular cycle of cleansing and filling operations described hereinbefore is given by way of example only and that many modifications of the cycle may be effected within the scope of the invention. As an illustration, the cleansing process may be so arranged that one or more of the cleansing materials is contained in each cask for a definite time before the outlet to the drain is opened and it is expelled. Again, if desired the casks may be filled with sulphur dioxide instead of beer and be placed in storage when so charged.

Although the present invention has been described with particular reference to specific details, it is not intended that such details shall be regarded as limitations upon the scope of the invention except insofar as included in the accompanying claims.

What we claim and desire to secure by Letters Patent is:

1. Apparatus for use with containers provided with a filling valve comprising, in combination, a valve member having two concentric passages on one side of the valved portion of the member, conduits for the inflow and outflow of cleansing and filling fluids leading to said valve member and terminating at the other side of said valved portion, first control means connected to said valve member and moving said member including its valved portion to control the application of said two passages to the container valve continuously throughout a cleansing and filling cycle, second control means connected to said valved portion to control the successive stages of said cycle by operation of said valved portion to bring said conduits into communication with said two passages in a pre-determined sequence, location indication means, including a pressure fluid connection leading to an orifice on the valve member adjacent the container valve ends of said two passages, operable by the correct engagement of the valve member with the container by said first control means, and an interlocking device controllable from said pressure fluid connection for actuating said second control means.

2. Apparatus according to claim 1 wherein said valved portion and said second control means are arranged to permit cleansing fluid to flow into the container through the outer of said two passages and out of the container through the inner passage, and to permit the filling fluid to flow into the container through the inner passage.

3. Apparatus according to claim 1 wherein said conduits comprise respective connections to washing and sterilizing fluid sources and wherein a liquid spray device has actuation means sequentially interconnected with said second control means to cool the container at a desired stage of the cleansing and filling cycle.

4. Apparatus for cleansing and filling a container having a filling valve comprising, in combination, conduits for cleansing and filling fluids, a valve member to which said conduits run, drive means secured to the valve member for moving it and applying it to the container valve, a pressure fluid supply leading to location indication means on the valve member, said indication means including an element actuatable by correct engagement of the container by the valve member to initiate the flow of fluids along said conduits, a tank located above said member for the filling liquid, a compressed sterile gas supply in communication with said tank, one of said conduits connecting the liquid in the tank to said valve member, a second of said conduits connecting said gas supply to said valve member, and a third of said conduits connecting the gas-filled top of said tank to said valve member, control means engaging said valve member when the member on the container is correctly located, thereby successively connecting said second conduit to the container, filling it with pressure gas, and then connecting said first and third conduits to the container simultaneously, whereby liquid flows from the tank through said first conduit to fill the container, while gas from the container is being displaced to the tank through said third conduit.

5. Apparatus according to claim 4 comprising a holding vessel, a froth collection chamber, an additional conduit disposed between said vessel and the valve member, an outlet conduit leading from said vessel to the froth collection chamber, a float valve within said vessel for closing the outlet when the vessel is filled with liquid and means for returning settled-out liquid from said chamber to the tank, said vessel being connectable to the valve member through said control means whereby the liquid between the tank and the container is fed to said vessel when the flow to the container is stopped and is allowed to flow from said vessel to another container in a succeeding filling operation.

6. Apparatus for cleansing and filling a container having a filling valve comprising, in combination, a valve member, conduits for the conveyance of cleansing and filling fluids connected to one side of said member, pneumatic motive means secured to said valve member to bring an engaging face on its other side into contact with an exterior surface of the container, a weep orifice on said face, a pipeline connecting said orifice to a restricted flow of air under pressure, whereby as the valve member moves into sealing engagement with said surface the orifice is closed and the pressure in said pipeline increases and pneumatic actuating means are arranged to operate when said pressure increases to initiate further stages in the working cycle of the apparatus.

7. Apparatus according to claim 6 wherein the valve member comprises a main body through which the cleansing and filling fluids flow and a depending part resiliently mounted upon said main body, said part having the weep orifice in its lower face.

8. Apparatus according to claim 6 for use with a container having a valve with dual passages normally held closed by an outwardly directed spring force, wherein the pneumatic motive means is connected to the valve member to move said member into engagement with the container and circuit means is provided for said motive means which includes a throttling device to supply initially intermediate pressure air to bring the valve member into sealing engagement with the container, the increase in pressure of said pipeline being arranged to cut out said throttling device and so increase the pressure acting in said motive means so as to urge open the passages of said container valve.

9. Apparatus for use with containers provided with a filling valve normally held closed by an outwardly directed spring force comprising, in combination, a plurality of valve members each having a pair of concentric passages leading to an engaging face for the throughflow of fluids between the member and a container, conduits for cleansing and filling fluids connecting each of said valve members to a common source for each of said fluids, first control means drivingly attached to each of said valve members and controlling the application of said members to the container valves continuously throughout a cleansing and filling cycle, respective second control means for actuating the successive stages of said cycle connected to the valved portion of each said valve member to operate said portion and bring said conduits into communication with the interior of a container in a pre-determined sequence, a series of projections in fixed spaced relation movable relative to said valve members and engageable with actuation elements of said first and second control means to initiate the operation of said means, location indication means on each valve member operable by the correct engagement of the valve member with a container by said first control means which include an interlocking device permitting the actuation of said second control means by said projections, an element of said second control means being movably governed by said location indication means to initiate the successive stages of the cycle upon operation of said location indication means.

10. Apparatus according to claim 9 having pneumatic operating means comprising a first valve, receiving intermediate pressure air, a second valve, receiving high pressure air, a pneumatic drive connected to each valve member to move it into engagement with a container, said valve member having an annular weep orifice surrounding said concentric passages on its engaging face, a control cylinder having a contacting member attached thereto, means for feeding initially air from said first valve to said drive to bring the engaging face of said valve member into sealing engagement with the container, a supply line, one end of which is connected to said orifice, means connected to the other end of said supply line operable by the increase in pressure at said orifice which operates said second valve thereby admitting high pressure air to said drive to open the container valve passages to the valve member concentric passages and also to feed high pressure air to said control cylinder to move said contacting member into the path of said projections.

11. Apparatus for use with containers provided with a filling valve normally held closed by an outwardly directed spring force comprising, in combination, a turntable upon which a plurality of containers can be carried, a plurality of valve members rotatable with said turntable, each valve member having a pair of concentric passages for the throughflow of fluids between the member and a container, ring mains rotatable with said turntable supplying fluids for a cleansing and filling cycle to said valve members, respective first movement means connected to each of said valve members controlling the application of said members to the container valves continuously throughout a cleansing and filling cycle, respective second movement means for initiating the successive stages of said cycle connected to and operating the valved portion of each of said valve members to bring said ring mains into communication with the interior of the container in a predetermined sequence, a series of stationary projections adjacent said turntable initiating the operation of said first and second movement means, location indication means disposed upon each member including a pressure fluid supply line linked to said second movement means and leading to a weep orifice on a face of the member closable by the correct engagement of the member with a container by said first movement means and a pressure-sensitive device linking said line to the second movement means, operable by the pressure build-up in the supply line to the weep orifice when said orifice is closed, thereby providing an interlock actuating the operation of said second movement means with its associated stationary projections.

References Cited by the Examiner

UNITED STATES PATENTS

| 838,735 | 12/06 | Momburg | 141—44 |
|---|---|---|---|
| 1,148,574 | 8/15 | Caspare | 141—91 XR |
| 1,889,629 | 11/32 | Bohmer et al. | 141—48 XR |
| 2,174,745 | 10/39 | Hoffman et al. | 141—44 XR |
| 2,178,559 | 11/39 | Cohen et al. | 137—240 XR |
| 2,810,406 | 10/57 | De Milleville | 141—44 XR |
| 3,013,591 | 12/61 | Stanley et al. | 141—284 XR |

FOREIGN PATENTS

| 231,212 | 2/11 | Germany. |
|---|---|---|

LAVERNE D. GEIGER, *Primary Examiner.*

RAPHAEL M. LUPO, *Examiner.*